Oct. 22, 1940. W. R. GRISWOLD 2,218,575
INTERNAL COMBUSTION ENGINE
Filed July 10, 1933
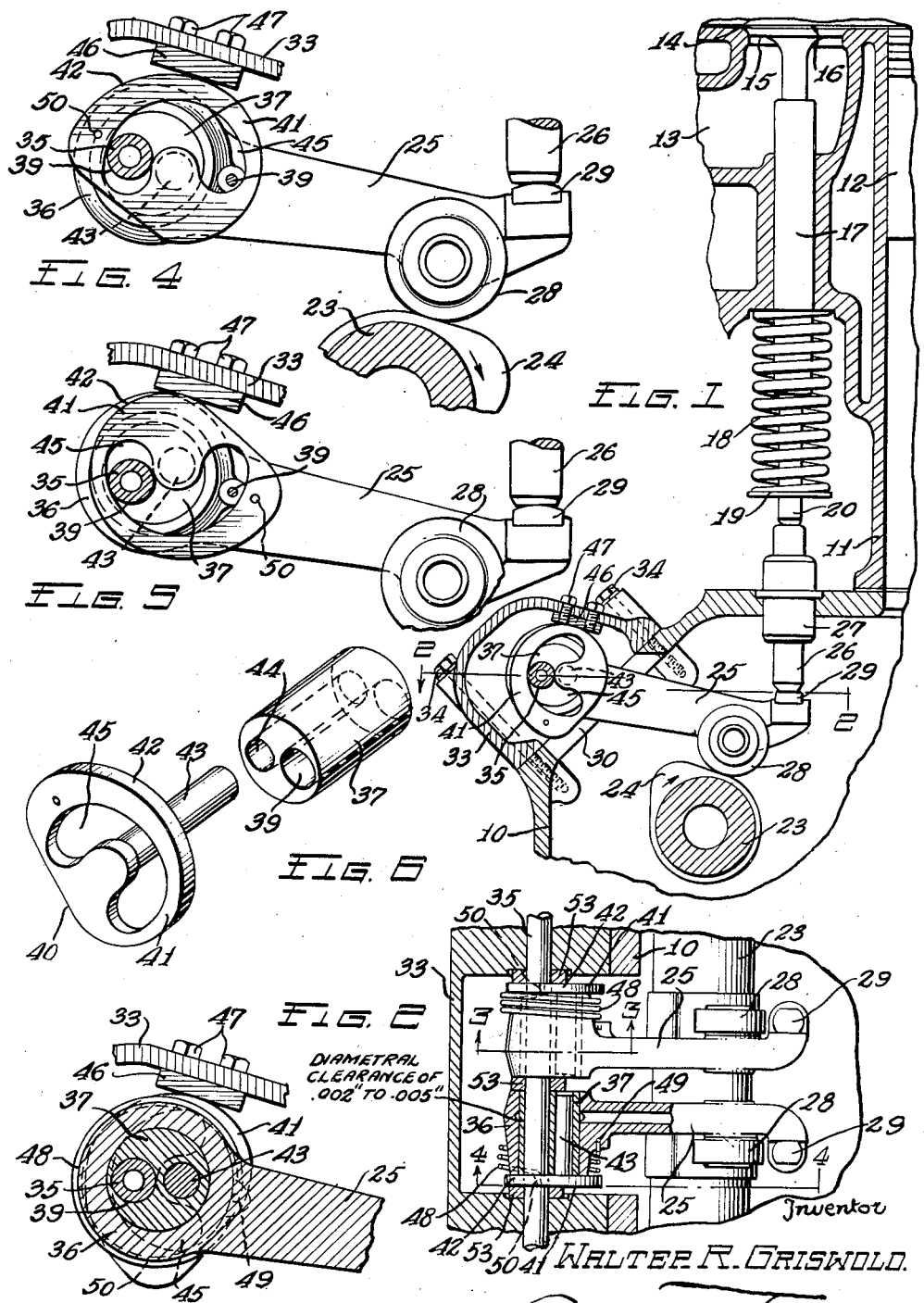

Patented Oct. 22, 1940

2,218,575

UNITED STATES PATENT OFFICE 2,218,575

INTERNAL COMBUSTION ENGINE

Walter R. Griswold, Detroit, Mich., assignor to Packard Motor Car Company, Detroit, Mich., a corporation of Michigan Application July 10, 1933, Serial No. 679,621

11 Claims. (Cl. 123—90)

This invention relates to internal combustion engines and particularly to the valve mechanism thereof.

The automobile engineer is constantly striving to eliminate noise from the various mechanisms of the vehicle. One of the most troublesome parts of the vehicle in this regard is the valve mechanism of the engine, principally because of the expansion and contraction of the parts of the engine in connection with which the valve mechanism is mounted.

The conventional valve mechanism includes poppet valves and a cam shaft for operating them. When the valve is closed there should preferably be clearance somewhere between the cam shaft and the valve stem, or at least there should be no riding of the valve stem on the cam shaft because in that case the valve would not be fully closed. Leakage would soon cause burning of the valve or loss of power due to lack of compression.

But if there is too much clearance the valve operating mechanism will be noisy due to the clearance being taken up suddenly.

Most engines provide for adjustment between the cam shaft and the valve stem so that a minimum of clearance may be provided for, but when this adjustment is made at one temperature of the engine the clearance will increase or decrease as the engine becomes hotter or cools off and then a noisy mechanism results or the valves will be caused to ride.

In some cases elaborate mechanisms have been provided for automatically taking up this valve mechanism clearance without at the same time causing the valves to ride and the present invention is concerned with this problem. An object is to provide such automatic take-up mechanism in simple form, in compact arrangement, and with the thought of insuring automatic adjustment over a fairly wide range.

In some of the prior art devices for automatic take-ups spring actuated cams have been used and while the spring operation of the cam promptly takes up the clearance difficulties have been experienced in effecting retraction of the cam to prevent valve riding. It is one of the objects of the present invention to remedy this difficulty and to provide a simple cam mechanism that will not only take up clearance but will also automatically retract when it is necessary to do so in the operation of the mechanism.

Other objects of the invention will appear from the following description taken in connection with the drawing, which forms a part of this specification, and in which:

Fig. 1 is a vertical sectional view of an internal combustion engine embodying my invention;

Fig. 2 is a section substantially on the line 2—2 of Fig. 1;

Fig. 3 is an enlarged sectional view on the line 3—3 of Fig. 2;

Fig. 4 is a sectional view substantially on the line 4—4 of Fig. 2;

Fig. 5 is a view similar to Fig. 4 with the parts in a different position, and

Fig. 6 is an exploded perspective view of two of the co-operating parts of the adjusting device.

Referring to the drawing, 10 represents the crank case of an internal combustion engine upon which is mounted a cylinder structure 11. A piston 12 is arranged within the cylinder and a passage 13 communicates with the combustion space 14 above the piston. The passage 13 may be either the inlet or exhaust passage of the engine.

The port 15 of the passage 13 into the cylinder combustion chamber is closed by a valve 16 mounted in a bushing 17 and yieldingly held in closed position by a coil spring 18, the latter acting between a portion of the cylinder structure and an abutment 19 on the stem 20 of the valve.

There is a cam shaft 23 of usual form mounted in the crank case 10, one of the cam lobes 24 being shown in Fig. 1 and in some of the other figures. Mounted between the cam shaft and the valve stem 20 are the elements for operating the valve as the cam shaft rotates. One of these elements is a rocker arm 25 and the other is a push rod 26 mounted in a sleeve 27 in the crank case. This push rod may or may not be an integral part of the valve stem 20 but it is usually non-integral and may be adjustable in length to take up larger tolerances in manufacture.

The rocker arm 25 has a roller 28 which contacts with the cam shaft and it is also preferably provided with a hardened steel bearing block 29 which contacts with the lower end of the valve stem or the push rod 26. The arm extends through an opening 30 in the crank case and is supported in a casing 33 which forms a cover for the opening 30 and is secured to the crank case as by bolts 34. The casing or cover 33 thereby becomes an integral part of the crank case for supporting purposes, and these parts support the cam shaft and the rocker arm. The rocker arm 25 is mounted to rock about its support so that as the cam lobe 24 rotates under the roller 28 the rocker arm will rock and lift the valve 16 against the action of the spring 18. The roller 28 will then roll down the opposite side of the lobe 24 and the valve will close.

From the above it will be seen that if the supported end of the rocker arm 25 is shifted in a generally vertical direction downwardly it will tend to close any clearance there may be between the opposite end of the rocker arm, or the bearing block 29, and the push rod 26, or if the supported end moves upwardly, it will tend to increase that clearance. So in this invention the rocker arm 25 is so supported that its supported end may be thus adjusted for clearance take-up. Of course this support also provides for the rocking action of the rock shaft in the operation of the valve mechanism.

For thus supporting the rocker arm a stationary rod or pin 35 is mounted in the casing 33, this rod being shown as parallel to the cam shaft 23. The supported end of the rocker arm 25 is enlarged as at 36 and is provided with a cylindrical bearing member 37 through which latter member the supporting rod or pin 35 extends. Usually the diametral clearance between the pin 35 and the bearing member 37 would be a half thousandth of an inch or thereabouts but in the present invention this clearance is made at least two thousandths but preferably not more than five thousandths of an inch as indicated in Fig. 2 on the drawing. This clearance permits a bodily movement, or endwise movement, of the rocker arm 25 in the operation of the valve mechanism. Thus it will be seen, referring to Fig. 1, that as the cam lobe 24 approaches the roller 28 there is a tendency not only to lift the rocker arm but to move it towards the right, the cam shaft 23 turning in the direction of the arrow thereon. Then as the cam lobe passes the roller and the roller starts to roll down on the opposite side of the lobe, there is a tendency for the rocker arm 25 to be moved bodily to the left, this being due to the pressure of the spring 18 bearing downwardly on the rocker arm. Thus there is a constant bodily shift of the rocker arm from right to left and back. The purpose of this vibratory movement will appear below.

The rod 35 extends eccentrically through the bearing member 37, the opening therefor appearing at 39, particularly in Fig. 6 so that with the parts in the position shown in Fig. 1, if the bearing member 37 is turned to the right about the pin 35, the axis of the bearing member 37 and consequently the axis about which the rocker arm 25 rocks, will be moved downwardly and consequently clearance will be decreased between the cam shaft and the valve stem. A reverse movement would increase the clearance.

For thus adjusting the axis about which the rocker arm 25 rocks, and hence adjusting the clearance, a cam member 40 is provided. This cam member is shown in the form of a disk 41, the periphery 42 of which is in the form of an involute with relation to a pin 43 which extends laterally from one face of the disk. This pin 43 fits a longitudinal opening 44 parallel to the opening 39 in the bearing member 37 as shown in the several views. The disk 41 is also formed with an arcuate slot 45 so that when the pin 43 is inserted in the bearing member 37 the rod or pin 35 may extend through this slot 45 and support the bearing member 37 without interfering with the operation of the cam member.

In the various views, except Fig. 6, the cam member 40 is shown in position with its disk 41 forming a bearing for one end of the bearing member 37 and with its pin 43 extending into the opening 44 in the bearing member 37. This latter opening 44 is eccentrically arranged relative to the parallel opening 39 and as shown is also eccentrically arranged relative to the axis of the bearing member 37. Thus, if the pin 43 is moved upwardly or downwardly, thus rotating the bearing member 37 about the axis of its supporting pin 35, the axis of the bearing member 37 will also be raised or lowered and consequently the rocker arm will decrease or increase the clearance as above explained. The cam face 42 is the means through which this raising and lowering of the pin 43 is effected.

With the parts assembled as shown in Figs. 1 and 2, the cam face 42 bears against a hardened block 46 which is a rigid element preferably secured to the casing 33 as shown by the screws 47. A coiled spring 48 surrounds a portion of the supported end 36 of the rocker arm and has one of its ends secured to the rocker arm as shown at 49 and its other end secured to the cam disk 41 as shown at 50. The spring thus tends to rotate the cam disk 41 about its pivot pin 43 and, as shown particularly in Fig. 1, this yielding rotation of the cam disk 41 in a clockwise direction will tend to press the pin 43 downwardly and thus rotate the bearing member 37 about the pin 35. This moves the axis of the bearing member 37 downwardly and consequently the rocker arm 25 takes up the clearance between the cam shaft and the valve stem until the action of the light spring 48 is stopped by the much heavier spring 18. This obtains zero clearance between the cam shaft and the valve stem 20.

But if by reason of a change in temperature of the various engine parts there is a tendency of the valve 15 to "ride," that is, a non-seating of the valve due to the clearance having been taken up too much, the cam 41 must be forced in an anti-clockwise direction against the action of its spring 48. This cannot be done by mere pressure alone. That is, the pressure of the spring 18 against the outer end of the rocker arm 25 cannot force the cam 41 backwardly without some definite movement of the rocker arm 25. This definite movement is supplied by the loose mounting of the rocker arm on its supporting pin 35 as above described so that if there is a tendency of the valve to "ride," the bodily movement of the rocker arm as it is operated by the cam shaft will vibrate the cam 41 on its rigid seat 46 and cause the cam to retract against the action of its spring 48 due to the upward pressure on its pin 43 through the spring 18 acting against the opposite end of the rocker arm with the cam shaft as a fulcrum intermediate the ends of the rocker arm.

In Fig. 2 two of the rocker arms are shown as mounted side by side on a single rod or pin 35 which extends through the bearing members 37 of both of the rocker arms. Spacing washers 53 are arranged between the rocker arms and between the cam disks and the adjacent casing. In a multi-cylinder engine there may be a series of these pairs of rocker arms all mounted in a single casing and the rocker arms may be assembled in the casing and then assembled on the crank case as a unit.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim and desire to secure by Letters Patent is:

1. In a valve take-up mechanism, the combination of a supporting pin, a bearing member eccentrically mounted on said pin, a rocker arm mounted on said bearing member, a second pin passing into the bearing member within the periphery thereof, and a yieldingly operated adjusting member connected directly to said second pin for adjusting said bearing member on its support.

2. In a valve take-up mechanism, the combination of a rocker arm, a bearing member for the rocker arm, a supporting pin extending eccentrically through the bearing member, a second pin passing into the bearing member parallel to the supporting pin, and means connected to said second pin for adjusting said bearing member relative to its support.

3. In a valve take-up mechanism, the combination with a valve, a cam shaft, and a rocker arm operating between the valve and the cam shaft, of a support, a bearing member upon which the rocker arm is mounted to rock, means for supporting said bearing member on the support so that the bearing member may be adjusted to effect clearance take-up between the valve and cam shaft and so that there may be slight movement lengthwise of the rocker arm, and a cam operating on a non-yielding surface and between the rocker arm and the support and adapted to adjust the rocker arm bearing member for clearance take-up and to retract to prevent valve riding.

4. In an engine valve mechanism, the combination with a cam shaft, a rocker arm having a part operating in contact with a cam on said shaft and a part for operating a valve, and a valve operated by said rocker arm, of a support for said cam shaft, a bearing member for said rocker arm, said rocker arm being mounted to rock on said bearing member, a pin on said support extending through said bearing member with such clearance that the bearing member and with it the rocker arm may move bodily in addition to its rocking action as the rocker arm is operated by the cam, and a cam device connected to said bearing member and operating on a non-yielding surface on said support for adjusting the bearing member for clearance take-up between the cam shaft and the valve.

5. In a valve take-up mechanism, the combination of a rocker arm, a bearing member therefor, a supporting pin passing eccentrically through the bearing member, a second pin passing into the bearing member, and a cam connected to said second pin and operating yieldingly to turn the bearing member on the supporting pin, for the purpose set forth.

6. In a valve take-up mechanism, the combination of a rocker arm, a bearing member therefor, a supporting pin passing eccentrically through the bearing member, a second pin passing into the bearing member, a cam connected to said second pin, and a spring connected to said cam tending to turn the bearing member on the supporting pin.

7. In a valve take-up mechanism, the combination of a cylindrical bearing member, a rocker arm mounted on said bearing member, two pins extending into said bearing member within the periphery thereof, one of said pins being eccentric to and forming a support for the bearing member, and means connected to the other pin for adjusting said bearing member relative to its support.

8. In a valve take-up mechanism, the combination of a cylindrical bearing member, a rocker arm mounted on said bearing member, two pins extending into said bearing member within the periphery thereof, one of said pins being eccentric to and forming a support for the bearing member, and means directly connected to the other said pin and bearing upon a support for adjusting said bearing member relative to its support.

9. In an engine valve mechanism, the combination with a cam shaft, a rocker arm having a part operating in contact with a cam on said cam shaft and a part for operating a valve, and a valve operated by said rocker arm, of a support for said cam shaft, means for mounting said rocker arm on said support, said mounting means including structure about which the rocker arm may rock as the rocker arm is moved by the cam shaft to operate the valve, said mounting means including structure with such clearances that the rocker arm may have a slight bodily movement as the side thrust of the cam operates against the rocker arm, and said mounting means including structure which supports the rocker arm for adjustment with relation to the valve and cam shaft to thereby vary the clearance between the valve and the cam shaft, means comprising a non-yielding surface, and cam means connected with said rocker arm mounting and operating on said surface to adjust said rocking axis during the operation of the mechanism.

10. In an engine valve mechanism, the combination with a cam shaft, a rocker arm having a part operating in contact with a cam on said cam shaft and a part for operating a valve, and a valve operated by said rocker arm, of a support for said cam shaft, means for mounting said rocker arm on said support, said mounting means including a pivot upon which the rocker arm may rock to operate the valve, said pivot and rocker arm having such clearance that the cam shaft will cause a slight bodily vibration of the rocker arm in addition to the rocking action thereof, and said pivot being adjustable so that the rocking axis of the rocker arm may be moved to vary the clearance between the cam shaft and the valve, means comprising a non-yielding surface, and cam means operating on said surface and connected to adjust the rocking axis of the rocking arm during the operation of the mechanism.

11. In a valve take-up mechanism, the combination of a valve operating member, a support, means for mounting said valve operating member on said support to provide for its normal movement in operating the valve, said mounting means providing such clearance that the valve operating member may vibrate, in addition to its normal movement, in operating the valve, means for moving said member to operate the valve and for causing translatory movement of said member, a spring actuated cam for changing the position of said member to take up clearance, and means including a surface against which said cam operates for guiding the bodily movement of said member, the bodily movement of said member operating to assist the action of the cam in the operation of the valve mechanism.

WALTER R. GRISWOLD.